June 7, 1966     H. P. BEHLEN     3,254,729
AUTOMATIC MATERIAL UNLOADING SYSTEM
Filed Sept. 11, 1963     3 Sheets-Sheet 1
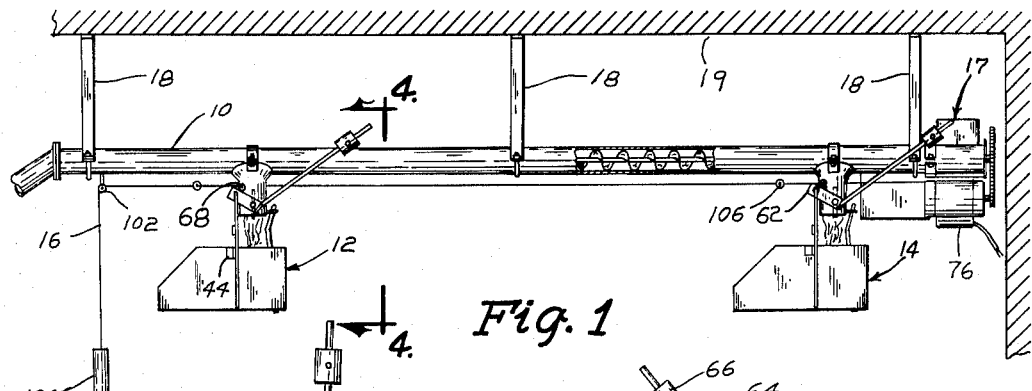
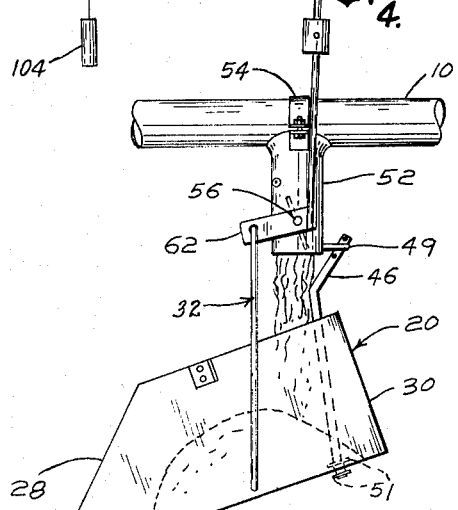
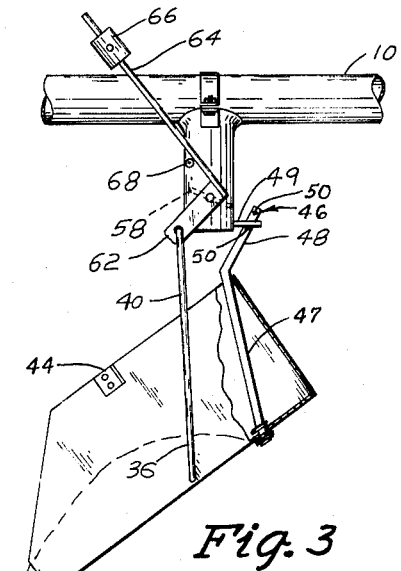
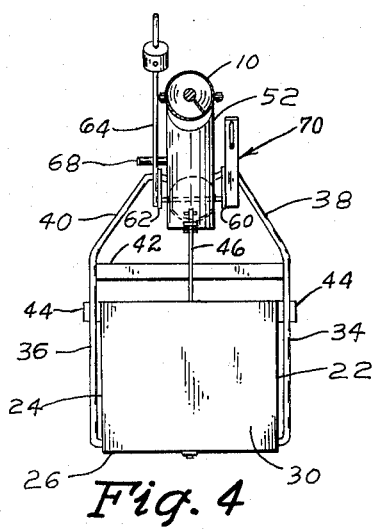
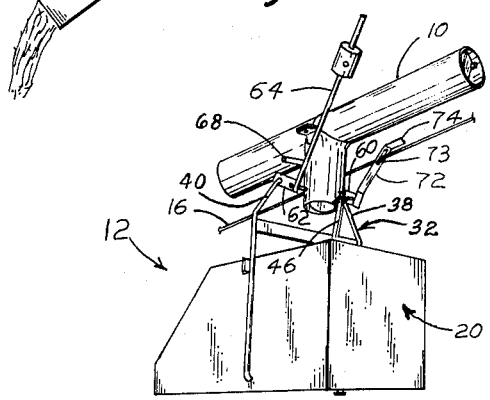
INVENTOR
HERBERT P. BEHLEN
BY
Dick + Zarley
ATTORNEYS

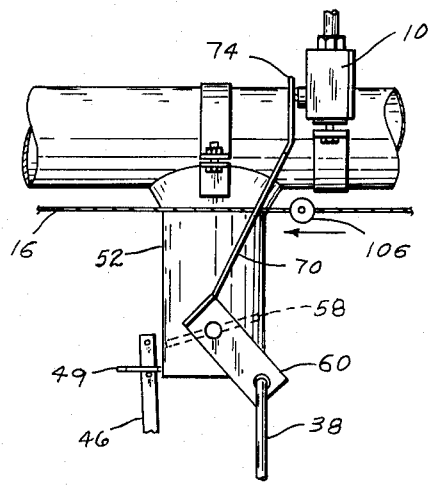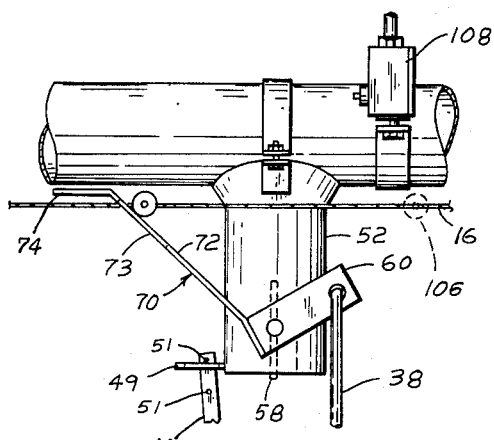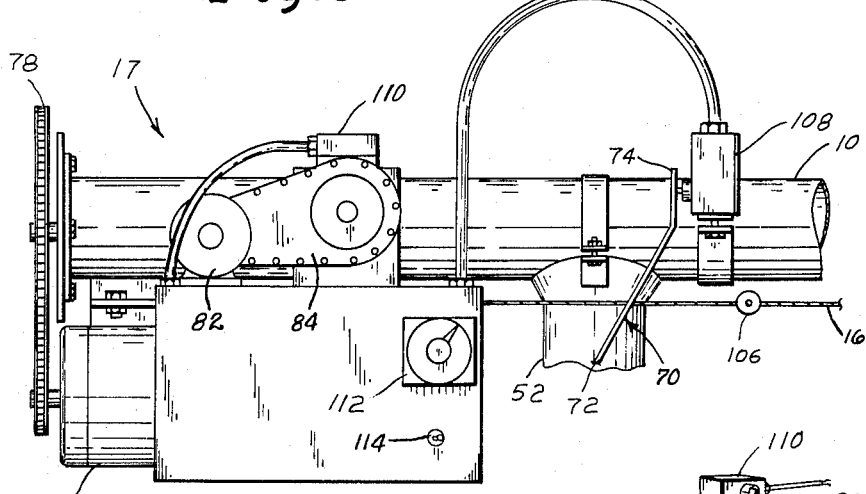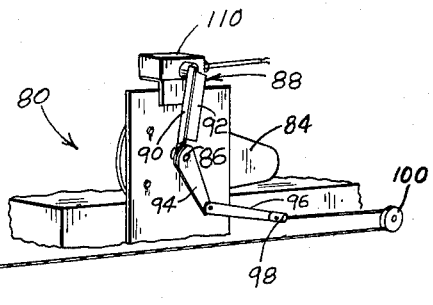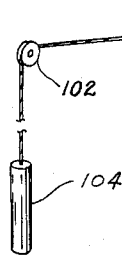

June 7, 1966  H. P. BEHLEN  3,254,729
AUTOMATIC MATERIAL UNLOADING SYSTEM
Filed Sept. 11, 1963  3 Sheets-Sheet 3
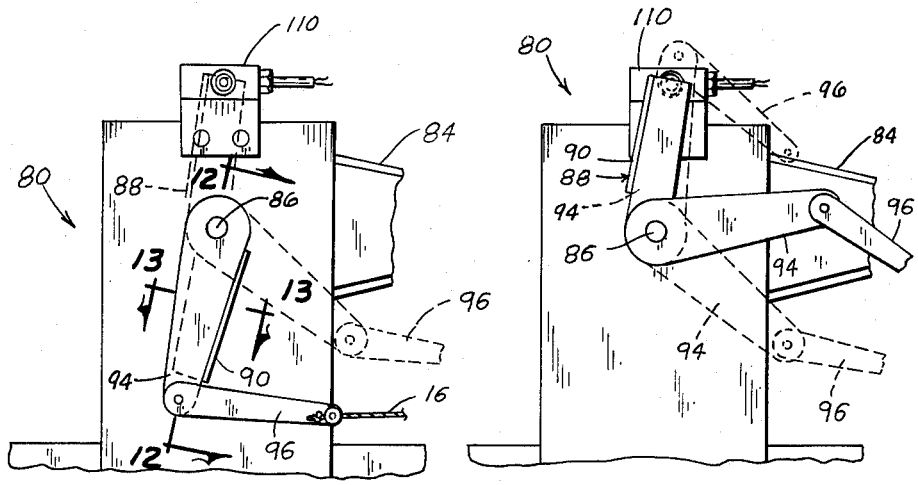
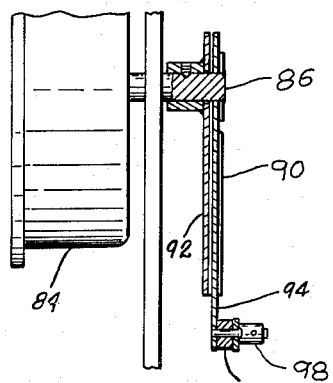
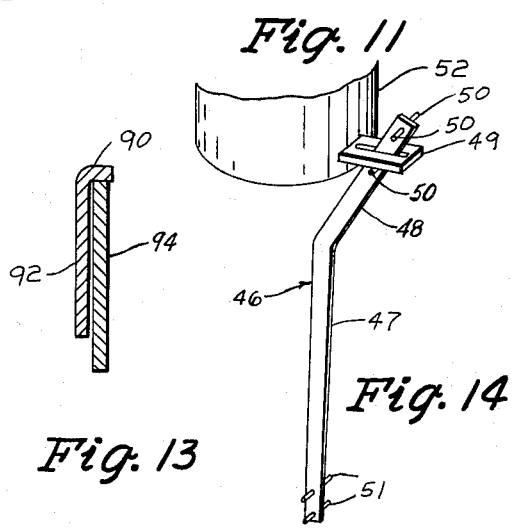
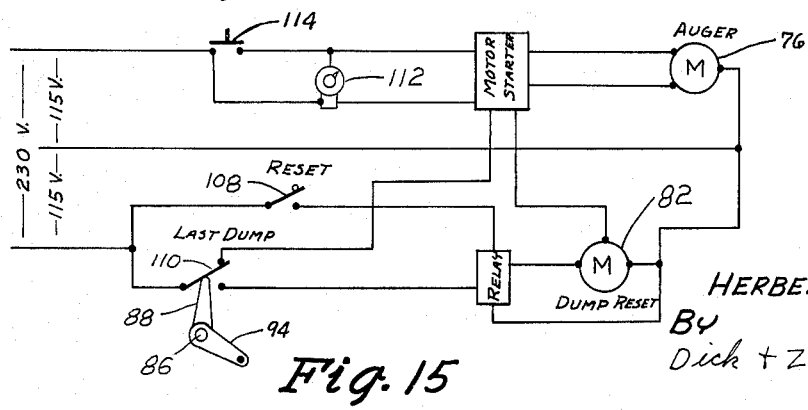
INVENTOR
HERBERT P. BEHLEN
BY
Dick + Zarley
ATTORNEYS United States Patent Office 3,254,729
Patented June 7, 1966

3,254,729
AUTOMATIC MATERIAL UNLOADING SYSTEM
Herbert P. Behlen, Columbus, Nebr., assignor to Behlen Manufacturing Company, Inc., Columbus, Nebr., a corporation of Nebraska
Filed Sept. 11, 1963, Ser. No. 308,246
14 Claims. (Cl. 177—103)

This invention relates to an automatic material unloading system and in particular to a system for automatically dispensing a predetermined amount of material at predetermined times.

Heretofore, feeding of farm animals has been either a manual or semiautomatic operation requiring considerable work by hand on the part of the farmer.

Therefore, it is an object of this invention to provide an automatic feed unloading system which will dispense a predetermined amount of feed at a plurality of stations at predetermined times;

It is a further object of this invention to provide an automatic feed unloading system which automatically resets itself after each feeding operation;

It is a further object of this invention to provide an automatic feed unloading system which will deliver to each feeding station the same or any desired amount of feed;

It is a further object of this invention to provide an automatic feed unloading system including a feed conveyor which will automatically shut off upon the last hopper in the feeding system receiving a predetermined amount of feed material;

It is a further object of this invention to provide an automatic feed unloading system wherein upon the dumping of the last hopper associated with the feed conveyor, a power means will be actuated to reset each of the hoppers to receive feed at a subsequent predetermined time;

It is a further object of this invention to provide an automatic feed unloading system which includes a signalling means for indicating to the operator whether the feed material dispensing hoppers are in a dumping position or loading position; and A further object of this invention is to provide an automatic feed unloading system which is simple in design, economical to manufacture and refined in appearance.

This invention consists in the construction, arrangements, and combination, of the various parts of the device, whereby the objects contemplated are attained as hereinafter more fully set forth, specifically pointed out in the claims, and illustrated in the accompanying drawings, in which:

FIG. 1 is a side elevation view of the complete unloading system wherein the hoppers are being filled by the auger conveyor;

FIG. 2 illustrates one hopper moving toward a dumping position while the valve in the conveyor spout moves toward a closed position;

FIG. 3 illustrates one of the hoppers in its dumping position with the valve in the conveyor spout in its closed position;

FIG. 4 is a rear end cross-sectional view of one of the hopper assemblies taken along line 4—4 in FIG. 1;

FIG. 5 is a perspective view of the hopper assembly;

FIG. 6 is a fragmentary side elevation view of the hopper reset arm in engagement with the reset micro switch when the hopper is in a dumping position;

FIG. 7 is a view similar to FIG. 6 however showing the reset arm in its normal position when hopper is in a horizontal loading position;

FIG. 8 is a fragmentary side elevation view of a conveyor system showing in particular the power and control equipment;

FIG. 9 is a perspective view of only the hopper reset power assembly;

FIG. 10 is a side elevation view of only the hopper reset power assembly showing in particular the cooperating arm members in various positions during the first half of the hopper reset operation cycle;

FIG. 11 is a view similar to FIG. 10 however showing the arm members in different positions during the second half of the hopper reset cycle.

FIG. 12 is a cross-sectional view of the hopper reset power assembly taken along line 12—12 in FIG. 10;

FIG. 13 is a cross-sectional view of the hopper reset power assembly taken along line 13—13 in FIG. 10;

FIG. 14 is a fragmentary perspective view of the hopper stabilizer arm showing in particular its connection to the auger conveyor spout; and FIG. 15 is an electrical schematic drawing of the automatic material unloading system.

The automatic material unloading system is shown in FIG. 1 to generally comprise an auger conveyor 10 having discharge openings in communication with hopper assemblies 12 and 14. A hopper reset cable 16 is connected in series to each of the hopper assemblies. Power and control equipment 18 for operation of the auger and the resetting of the hopper assemblies is located at the far end of the auger conveyor remote from the material inlet end.

The auger conveyor 10 is suspended by hangers 18 to the ceiling or roof 19 of a building as shown in FIG. 1. The hopper assembly 12 suspended from the auger conveyor 10 is shown in FIGS. 1 through 5 to include a hopper 20 which is rectangular in plan view. It comprises side walls 22 and 24 tapered at one end and having a bottom wall 26 joined at the other end by a wall 30. A hanger assembly 32 comprising a pair of parallel arms 34 and 36 are pivotally connected to the side walls 22 and 24. The arms 34 and 36 have upper portions 38 and 40 bent inwardly towards each other. A brace 42 extends between the arms 34 and 36 above the hopper 20. On the outside of the side walls 22 and 24, stop elements 44 are provided to limit pivotal movement of the hopper backwards or clockwise as viewed in FIG. 1. A stabilizer arm 46 (FIGS. 3 and 14) is provided to limit pivotal movement of the hopper 20 towards a dumping position. A first portion 47 of the arm 46 is movably secured to the bottom wall 26 between the pivotal connection of the hanger arms 34 and 36 and the end wall 30 of the hopper 20. A second portion 48 is provided at the upper end of the first portion 47 and extends towards and above the rear end wall 30 and is adapted to move in a slotted member 49 between a pair of stop pins 50 affixed to the second portion 48. A pair of pins 51 are provided at the lower end of portion 47 on opposite sides of the bottom wall 26 to limit movement of the end portion thereof through the bottom wall.

The hanger assembly 32 is pivotally connected to a tubular spout 52 secured to the underside of the auger conveyor 10 (FIG. 2). A strap clamp 54 extends over the auger conveyor to hold the spout in a position directed downwardly into the hopper 20. A pivot pin 56 extends through the spout 52 and carries a damper valve 58 inside the spout. At each end of the pivot pin 56 are plate arms 60 and 62 fixedly connected thereto intermediate their ends. The free ends of arm portions 38 and 40 are pivotally connected to the forward ends of the arms 60 and 62. At the rear end of arm 62, a balance arm 64 (FIG. 2) is fixedly secured and extends upwardly and slightly rearwardly when the arm 62 is in a horizontal position. A movable weight 66 is carried on the outer end of the arm 64 and may be adjusted thereatlong to provide the desired rotational force on the pivot pin 56. When the hopper is in a horizontal position, the arm 62 is rotatable clockwise as viewed in FIG. 1 to about a 30 degree angle with the horizontal and the balance arm 64 is accordingly moved closer to the horizontal thereby increasing the torque on the pivot pin 56.

A post stop 68 extends outwardly from the spout 52 above the parallel to the pivot pin 56. In FIG. 3, it is shown limiting the downward pivotal movement of the balance arm 64 when the hopper 20 is dumped and in FIG. 1 assisting in limiting the upward pivotal movement of the arm 62.

Fixedly secured to the pivot pin 56 on the opposite side of the spout 52 from the balance arm 64 is a reset arm 70 generally parallel thereto as shown in FIGS. 5 through 8 of the drawings. The arm 70 has a first portion 72 formed with a slot 73 through which cable 16 extends. A second portion 74 is integral with the first portion 72 and lies in a vertical plan when the hopper is in a dumping position as shown in FIGS. 6 and 8.

The power and control equipment 19 is shown in FIG. 8 to include a motor 76 for operation of the auger 10 through an endless chain 78. A hopper reset power assembly 80 is shown in FIGS. 9, 10 and 11 for operating the reset cable 16. This assembly includes a motor 82 which is coupled in a conventional manner inside a housing 84 to a shaft 86 (FIGS. 9, 10 and 11) which is fixedly secured to an arm 88. The arm 88 is elongated and has an angle iron shape in cross-section with a pair of flange portions 90 and 92 (FIG. 9). An arm 94 is rotatably mounted on the shaft 86 and has an elongated member 96 pivotally connected to its outer end. The member 96 in turn has a spool 98 rotatably mounted on its outer end. The spool 98 is then secured to one end of the reset cable 16 which extends around a pulley 100 (FIGS. 1 and 9) and back along the hopper reset power assembly 80 and the auger 10 where it extends over a pulley 102 and terminates in a vertical plane secured to a weight member 104. Along the cable 16 adjacent each hopper assembly 12 or 14, a button 106 is provided for engagement with the hopper reset arm portion 72 for returning the hoppers to their horizontal positions.

As illustrated in FIGS. 6, 7 and 8, a micro switch 108 is secured to the auger conveyor 10 adjacent the last hopper 14 and schematically illustrated in FIG. 15 where it is referred to as a reset switch. It serves to open and close an electrical circuit including the dump reset motor 82. A second micro switch 110 (FIGS. 8, 9, 10 and 11) is provided above and adjacent the housing 84 for engagement by the reset power arm 88. This switch is in a circuit including the auger motor 76.

A timer circuit as shown in FIG. 15 includes a momentary control switch timer 112 (see also FIG. 8) and a manually operated switch 114 normally held in an opened position.

The operation of the automatic material unloading system is as follows:

The timer 108 is set to automatically energize the system at predetermined times such as every eight hours. Or it may be manually energized by operation of switch 114. In either case, the auger motor 76 begins to supply feed through the spouts 52 as shown in FIG. 1. When a predetermined amount of feed is deposited in the hopper 20 of the hopper assembly 12, it will cause a rotational force on the pivot pin 56 which exceeds the opposing rotational force of the balance arm 64 and thereby permit the hopper 20 to tilt downwardly as shown in FIG. 2 to discharge the feed material as shown in FIG. 3. Simultaneously with the hopper 20 moving to its dumping position in FIG. 3, the valve 58 is closed thereby preventing any further feed being deposited in the hopper 20. The downward pivotal movement of the hopper 20 on the hanger arms 34 and 36 is limited first by the balance arm 64 engaging the post stop 68 as shown in FIG. 3 and the stabilizer arm 46 abutting against the top edge of the rear hopper end wall 30. It is to be understood that although the balance arm 64 was sufficient to hold the hopper 20 in a horizontal position prior to being loaded, once the hopper has moved to the dumping position of FIG. 3 the balance arm 64 has shifted its center of gravity to the opposite side of the pivot pin 56 and thereby holds the hopper assembly in a dumping position and the valve 58 in a closed position. When the hopper 20 is in its horizontal position as shown in FIG. 1, it is provided with two means for limiting its backward rotational movement. First, the hanger arms 34 and 36 abut against the stop elements 44 and secondly, the stabilizer arm 46 supports the rear end of the hopper 20 against downward movement.

Any number of hopper assemblies 12 may be provided along the auger conveyor 10 and each of them will operate in the same manner as the hopper assembly just described except that they will fill and dump sequentially in the order of their position from the inlet end of the auger 10. However, when the hopper assembly 14 dumps, portion 74 of the hopper reset arm 70 will move into engagement with the micro switch 108 as shown in FIG. 6 thereby closing the switch and the circuit including the dump reset motor 82. The dump reset motor 82 operates the hopper reset power assembly 80 and in particular the arm 88 which will move clockwise as shown in FIGS. 10 and 11 and contact arm 94 at about the 4 o'clock position represented by the dash lines in FIG. 10 thereby pulling the cable 16 to the right as the system is viewed in FIG. 1 whereby the buttons 106 will contact the hopper reset arm 70 on each of the hopper assemblies as shown in FIG. 6 and move these arms to the position shown in FIG. 7 thereby returning the hoppers to their horizontal positions and opening the valves 58 in the spouts 52. When the arm 88 has returned to its 12 o'clock position in engagement with the last micro switch 110, the arm 94 will fall freely downwardly due to the weight 104 on the end of the cable 16 and thereby assume the position represented by the dash lines at approximately 4 o'clock in FIG. 11. By the arm 88 moving out of engagement with the micro switch 110 the circuit including the auger motor 76 will be opened and thereby stopping further conveyance of material until the system is restarted either manually by operation of the switch 114 or automatically by the reset timer 112. Once the circuit within the timer 108 has been de-energized by opening the auger motor 76 circuit it will not re-energize by the closing of the auger motor circuit at the last dump micro switch 110. It is to be understood by reference to the schematic drawing in FIG. 15 that although the reset switch 108 is opened once the hoppers have been returned to their horizontal position which will occur at the time that the arm 88 has reached a position of about 9 o'clock, the dump reset motor circuit will still be closed by virtue of the micro switch 110 having moved from the auger motor circuit to the dump reset motor circuit. And accordingly, when the arm 88 returns to the 12 o'clock position as shown in FIG. 15 the dump reset circuit is reopened and the auger motor circuit is closed providing the circuit is closed at the timer 108.

Thus it is seen that any number of feeding stations may be provided with a precise amount of feed material automatically at any predetermined times. It is also emphasized that the auger 10 is only in operation for the minimum time required during any cycle to fill each of the hoppers 12 and 14 and once the last hopper, the hopper 14 is filled the auger 10 is automatically stopped until the next scheduled time for operation.

From a consideration of the foregoing disclosure, it will be obvious that all of the initially recited objects of the present invention have been achieved.

Some changes may be made in the construction and arrangement of my automatic material unloading system

I claim:

1. In an automatic material unloading system, comprising in combination,
material conveyor means having inlet and outlet means;
power means for driving said conveyor means;
hopper means;
a conduit connecting the outlet of said conveyor means with the hopper means;
valve means for opening and closing said conduit to the passage of material to said hopper;
means for indicating when said hopper has received a predetermined amount of material; and
means operatively connected to said last mentioned means for dumping said hopper means upon its receiving said predetermined amount of material and further, closing said valve means.
hopper means upon its receiving said predetermined amount of material and further, closing said valve means.

2. In an automatic material unloading system, comprising in combination,
material conveyor means having inlet and outlet means;
power means for driving said conveyor means;
hopper means;
a conduit connecting the outlet of said conveyor means with the hopper means;
valve means for opening and closing said conduit to the passage of material to said hopper;
support means pivotally supporting said hopper;
weight balancing means for holding said hopper in a material receiving position;
means operatively connected between said valve means and said hopper to close said valve means when said hopper is rotated to a dumping position; and
a predetermined amount of said material adapted to enter said hopper and shift the center of gravity of said hopper against the action of said weight balancing means and thereby rotate said hopper to a dumping position for discharging said material.

3. In an automatic material unloading system, comprising in combination,
material conveyor means having inlet and outlet means;
power means for driving said conveyor means;
hopper means;
a conduit connecting the outlet of said conveyor means with the hopper means;
valve means for opening and closing said conduit to the passage of material to said hopper;
support means pivotally supporting said hopper;
weight balancing means operatively connected to said hopper and tending to pivot said hopper in one direction and further to hold said hopper in a material receiving and storing position;
means for limiting pivotal movement of said hopper in said one direction beyond said receiving and storing position;
means operatively connected between said valve means and said hopper to close said valve means when the said hopper is rotated to a dumping position; and
a predetermined amount of said material adapted to enter said hopper and shift the center of gravity of said hopper against the action of said weight balancing means and thereby rotate said hopper to a dumping position for discharging said material.

4. In an automatic material unloading system, comprising in combination,
an elongated material conveyor means having a plurality of outlet means along its length and an inlet means;
power means for driving said conveyor means to convey material to said outlet means;
a valve means in each of said outlet means for opening and closing each of said outlet means;
a material measuring means positioned to receive material from each of said outlet means and operatively connected to each of said valve means for closing said value means upon discharge of a predetermined amount of said material through said respective outlet means;
said material measuring means associated with the last outlet means being farthest from said inlet means being operatively connected off said power means and stopping said conveyor means upon discharge of a predetermined amount of said material through said last outlet means.

5. The structure of claim 4 and timer means for turning on said power means at predetermined times subsequent to the end of each cycle to repeat the material unloading cycle.

6. In an automatic material unloading system, comprising in combination,
material conveyor means having a plurality of outlet means and an inlet means;
power means for driving said conveyor means;
valve means for opening and closing said outlet means for at least each of said outlet means between said inlet means and the last outlet means most remote from said inlet means;
an individual hopper means in communication with each of said outlet means, said hopper adapted to be pivoted from a material receiving and storing position to a dumping position;
yieldable means for holding said hoppers in said material receiving position;
individual means associated with each hopper for closing said respective valve means upon said hopper receiving a predetermined amount of material;
individual means associated with each hopper for rotating it to said dumping position upon its receiving said predetermined amount of material; and
means associated with said last hopper for shutting off said power means upon said last hopper receiving said predetermined amount of material.

7. In an automatic material unloading system, comprising in combination,
material conveyor means having a plurality of outlet means and an inlet means;
power means for driving said conveyor means;
valve means for opening and closing said outlet means for at least each of said outlet means between said inlet means and the last outlet means most remote from said inlet means;
an individual hopper means in communication with each of said outlet means, said hopper adapted to be pivoted from a material receiving and storing position to a dumping position;
yieldable means for holding said hoppers in said material receiving position;
individual means associated with each hopper for closing said respective valve means upon said hopper receiving a predetermined amount of material;
individual means associated with each hopper for rotating it to said dumping position upon its receiving said predetermined amount of material;
means associated with said last hopper for shutting off said power means upon said hopper receiving said predetermined amount of material; and
means associated with said last hopper for pivoting all of said hoppers back to their material receiving positions upon said last hopper being rotated to said dumping position.

8. In an automatic material unloading system, comprising in combination, material conveyor means having a plurality of outlet means and an inlet means;

power means for driving said conveyor means;

valve means for opening and closing said outlet means for at least each of said outlet means between said inlet means and the last outlet means most remote from said inlet means an individual hopper means in communication with each of said outlet means, said hopper adapted to be pivoted from a material receiving and storing position to a dumping position;

yieldable means for holding said hoppers in said material receiving position;

individual means associated with each hopper for closing said respective valve means upon said hopper receiving a predetermined amount of material;

individual means associated with each hopper for rotating it to said dumping position upon its receiving said predetermined amount of material;

means associated with said last hopper for shutting off said power means upon said hopper receiving said predetermined amount of material;

means associated with said last hopper for pivoting all of said hoppers back to their material receiving positions upon said last hopper being rotated to said dumping position; and timer means for restarting said power means at predetermined times to repeat the material unloading cycle.

9. In an automatic unloading system, comprising, a support means;

an arm pivotally connected intermediate its ends to said support means and adapted to pivot in a vertical plane;

a hopper having an outlet means, said hopper adapted to pivot between a normally raised loading position to a downwardly extending dumping position;

a support hanger pivotally connected to said hopper intermediate its ends, the other end of said support hanger pivotally connected to one end of said arm;

an elongated balance member secured to the other end of said arm and normally extending horizontally away from the pivotal axis of said arm when said hopper is in said normal raised loading position and said arm is in its normal position;

a material supply means having an outlet means in communication with said hopper;

a valve means for opening and closing said material supply outlet means, said valve means being operatively connected to said hopper, said hopper opening said valve means when in said normal raised position and closing said valve means when in said downwardly extending dumping position; and said hopper adapted to receive material from said material supply until the rotational force on said arm due is in excess of the rotational force of said balance member whereupon said hopper pivots downwardly to said dumping position to discharge said material through said hopper outlet means.

10. The structure of claim 9 wherein said balance member is adapted to be rotated on said arm to a position with its center of gravity on the opposite side of the axis of rotation of said arm when said hopper is pivoted to said dumping position whereby said hopper is yieldingly held in said dumping position.

11. The structure of claim 9 wherein said balance member is adapted to be rotated on said arm to a position with its center of gravity on the opposite side of the axis of rotation of said arm when said hopper is pivoted to said dumping position whereby said hopper is yieldingly held in said dumping position and means for pivoting said arm back to its normal position and thereby returning said hopper to its horizontal position and said balance member to its normal position.

12. In an automatic unloading system, comprising, a material outlet conduit;

a support means rotatably secured to said conduit;

a valve means connected to said support means and disposed in said outlet conduit to open and close the same;

an arm fixedly connected intermediate its ends to said support means and adapted to pivot in a vertical plane;

a hopper having an outlet means;

a support hanger pivotally connected at one end to said hopper intermediate its ends, the other end of said support hanger pivotally connected to one end of said arm;

An elongated balance member secured to the other end of said arm and normally extending horizontally away from the pivotal axis of said arm when said hopper is in its normal raised horizontal position with said arm in its normal position and said valve open;

said hopper adapted to be filled with material having a predetermined weight, the rotational force on said arm due to said filled hopper being in excess of the rotational force of said balance arm thereby permitting said hopper to pivot downwardly to a dumping position and discharge said material through said outlet means, and further move said valve to a closed position.

13. The structure of claim 12 wherein said balance member is adapted to be rotated with said arm to a position with its center of gravity on the opposite side of the axis of rotation of said arm when said hopper is pivoted to said dumping position whereby said hopper is yieldingly held in said dumping position.

14. The structure of claim 13 wherein said balance member is adapted to be rotated with said arm to a position with its center of gravity on the opposite side of the axis of rotation of said arm when said hopper is pivoted to said dumping position whereby said hopper is yieldingly held in said dumping position and means for pivoting said arm back to its normal position and thereby returning said hopper to its horizontal position and said balance member to its normal position, and to open said valve means.

References Cited by the Examiner

UNITED STATES PATENTS

| | | | |
|---|---|---|---|
| 448,316 | 3/1891 | Butts | 177—116 |
| 975,005 | 11/1910 | Wade | 177—103 X |
| 1,386,790 | 8/1921 | McLeod | 177—106 |
| 2,681,639 | 6/1954 | Littlefield | 119—57 |
| 3,085,552 | 4/1963 | Pilch | 119—57 |
| 3,119,526 | 1/1964 | Sutton | 222—56 |

LEO SMILOW, *Primary Examiner.*

S. J. TOMSKY, *Assistant Examiner.*